United States Patent [19]
Garland et al.

[11] Patent Number: 6,038,297
[45] Date of Patent: Mar. 14, 2000

[54] SYSTEM FOR PARTY LINE SUPPRESSED RINGING ACCESS OF SUBSCRIBER LINES

[75] Inventors: Stuart M. Garland, Morton Grove; David B. Smith, Hinsdale, both of Ill.

[73] Assignee: Lucent Technologies Inc., Murray Hill, N.J.

[21] Appl. No.: 09/092,246

[22] Filed: Jun. 5, 1998

[51] Int. Cl.[7] .................................................. H04M 11/00
[52] U.S. Cl. .............................. 379/106.01; 379/106.03; 379/177
[58] Field of Search .................... 379/106.01, 106.03, 379/106.05, 106.07, 106.08, 106.09, 177, 187

[56] References Cited

U.S. PATENT DOCUMENTS 3,922,492  11/1975  Lumsden ........................... 379/106.07

*Primary Examiner*—Paul Loomis
*Assistant Examiner*—Melur Ramakrishnaiah
*Attorney, Agent, or Firm*—Duft, Graziano & Forest, P.C.

[57] ABSTRACT

The system for party line suppressed ringing access enables a service provider to access both a subscriber line and the equipment that is connected to this subscriber line. The present system makes use of the availability of party line communication apparatus, in the form of a subscriber line network interface that is equipped to interface to two lines: the subscriber line, and a telemetry party line. When an incoming call is identified as a suppressed ringing telemetry access call, the serving central office accesses the subscriber line via a suppressed ringing connection on the telemetry party line. The service provider can poll a plurality of the subscribers that are connected to the telemetry party line by means of distinctive signaling to poll each subscriber network interface seriatim. Once the subscriber network interface recognizes a poll received on the telemetry party line, it interconnects the telemetry equipment to the telemetry party line and the telemetry access operation proceeds in well known fashion to retrieve collected telemetry data from telemetry equipment connected to the subscriber line or perform tests on the subscriber line or equipment connected thereto, or perform any other data collection function on the selected subscriber line.

12 Claims, 3 Drawing Sheets

SYSTEM FOR PARTY LINE SUPPRESSED RINGING ACCESS OF SUBSCRIBER LINES

CROSS REFERENCE TO RELATED APPLICATIONS

This application is related to a U.S. Patent Application, titled "System for Direct Suppressed Ringing Access of Subscriber Lines" filed on the same date as the present application.

1. Field of the Invention

This invention relates to subscriber line access systems and, in particular, to a system that provides a user or a service provider with party line access to a selected subscriber line via a suppressed ringing connection.

2. Problem

It is a problem in the field of telemetry monitoring for the telemetry service provider to obtain reliable and inexpensive access to subscriber lines and the telemetry equipment that is connected to the subscriber lines in a manner similar to an extension telephone. In telemetry applications, the telemetry equipment to be polled typically resides at the customer premises, such as a residence. The telemetry equipment can comprise utility meters, appliance controllers, medical monitoring equipment, telephone line test apparatus, and the like. The telemetry equipment is typically connected via the telephone company network interface unit to the serving subscriber line in a manner similar to an extension telephone. The telemetry service provider access to the telemetry equipment is effected by the use of a Central Office Service Unit (COSU) or COSU emulator that is connected to the serving central office switch via a plurality of dedicated Utility Telemetry Trunks (UTTs). In operation, the telemetry application user, such as a utility company, dials or is directly connected to the Central Office Service Unit which connects the telemetry service provider via one of the dedicated Utility Telemetry Trunks to the serving central office switch, which then provides a suppressed ringing connection to the selected subscriber line. The telemetry applications controller collects data from the polled telemetry equipment and the trunk connection is then dropped. An alternative architecture supports direct access using the emulation of a Central Office Service Unit over E&M analog or digital trunking. The Central Office Service Unit functionality (the support of the Utility Telemetry Trunk protocol) may be emulated by a personal computer or workstation at the server site and not require an adjunct Central Office Service Unit at the central office.

The problem with this arrangement is that the subscriber line cannot be accessed if the subscriber is presently using the line for a call connection. Therefore, when the subscriber is on an extended duration call, such as Internet browsing, the telemetry service provider application must periodically return to this subscriber line to attempt to reconnect. These repeated reconnect attempts add to the cost and speed of the telemetry data collection function. A further option is if a telemetry connection is presently active and a regular incoming call is received for the subscriber line, the telemetry connection could be dropped to immediately service the incoming call. Therefore, the shared use of the subscriber line interferes with the ability of the service provider to obtain a suppressed ringing connection to the customer premise equipment connected to the subscriber line. While in many telemetry applications, this interruption is not a significant problem, the telemetry equipment that requires prompt servicing, such as medical monitoring, security, and appliance control cannot wait an extended period of time to be accessed. One solution to this problem is the provision of a second line to the subscriber's premises that is dedicated to telemetry applications, but this represents a costly solution and many central office systems do not have the physical plant to implement this solution.

Thus, there is presently no simple and inexpensive method or apparatus that enables a service provider to access the telemetry equipment that is connected to subscriber lines via a suppressed ringing connection for the purpose of telemetry data collection.

SOLUTION

The above-described problems are solved and a technical advance achieved in the field by the system for party line suppressed ringing access that enables a service provider to access both a subscriber line and the equipment that is connected to this subscriber line. The present system makes use of the availability of party line communication apparatus, in the form of a subscriber line network interface that is equipped to interface to two lines: the subscriber line, and a telemetry party line. When an incoming call is identified as a suppressed ringing telemetry access call, the serving central office accesses the subscriber line via a suppressed ringing connection on the subscriber line. If the subscriber line is busy, the serving central office can access the telemetry equipment via the telemetry party line. The service provider can poll a plurality of the subscribers that are connected to the telemetry party line by means of distinctive signaling to poll each customer premise device that is connected to the subscriber network interface. Once the subscriber network interface recognizes a poll received on the telemetry party line, it interconnects the telemetry equipment to the telemetry party line and the telemetry access operation proceeds in well known fashion to retrieve collected telemetry data from telemetry equipment connected to the subscriber line or perform tests on the subscriber line or equipment connected thereto, or perform any other data collection function on the selected subscriber line.

The subscriber lines can be accessed in groups using a party line service connection, where a large number of subscriber network interfaces are bridged on to a single party line. In addition, the subscriber line can be accessed from any location, as long as the incoming call is identified and authenticated as a suppressed ringing access call. There are numerous methods proposed for identifying the incoming call as a suppressed ringing access call and these can be broadly classified as either preauthorized call originations or service provider authorization on a per call basis. Included in the first category, the serving central office switch can maintain a list of predefined line numbers that are used by an authorized service provider to perform the suppressed ringing access function. When an incoming call is received by the central office switch that serves these predefined lines, the serving central office switch scans the Automatic Number Identification (ANI) of the incoming line to validate the identity and authorization of the calling party. If the calling party is an authorized service provider, the serving central office triggers an intelligent network function to signal the central office switch that serves the identified subscriber line to automatically cause the initiation of a suppressed ringing connection from the service provider to the identified subscriber line based upon the validated identity of the call originating line. One other calling party validation arrangement is for the ANI information to be passed to the central office switch that serves the identified subscriber line for calling party validation. Alternatively, the suppressed ringing connection is accomplished by the inclusion of a predefined code in the dial string by the service provider to identify this call origination as a suppressed ringing access call. This process is the same as the activation of a subscriber line function, such as deactivation of call waiting service. Again, the serving central office switch scans the Automatic Number Identification (ANI) of the call originating line to validate the identity and authorization of the calling party and triggers an intelligent network function that automatically causes the initiation of a suppressed ringing connection to the identified subscriber line based upon the validated identity of the call originating line and the prefix code that indicates this as a suppressed ringing call connection.

The second category of suppressed ringing access call identification includes manual authorization on a per call basis where the service provider dials the number of a predefined access line, which connects the service provider to a suppressed ringing access apparatus that authenticates the identity of the service provider and their authority to initiate a suppressed ringing access connection to the selected subscriber line. Once the service provider authentication is accomplished, the suppressed ringing access apparatus then forwards the incoming call to the identified subscriber line via a suppressed ringing connection.

DETAILED DESCRIPTION

Figure 1:
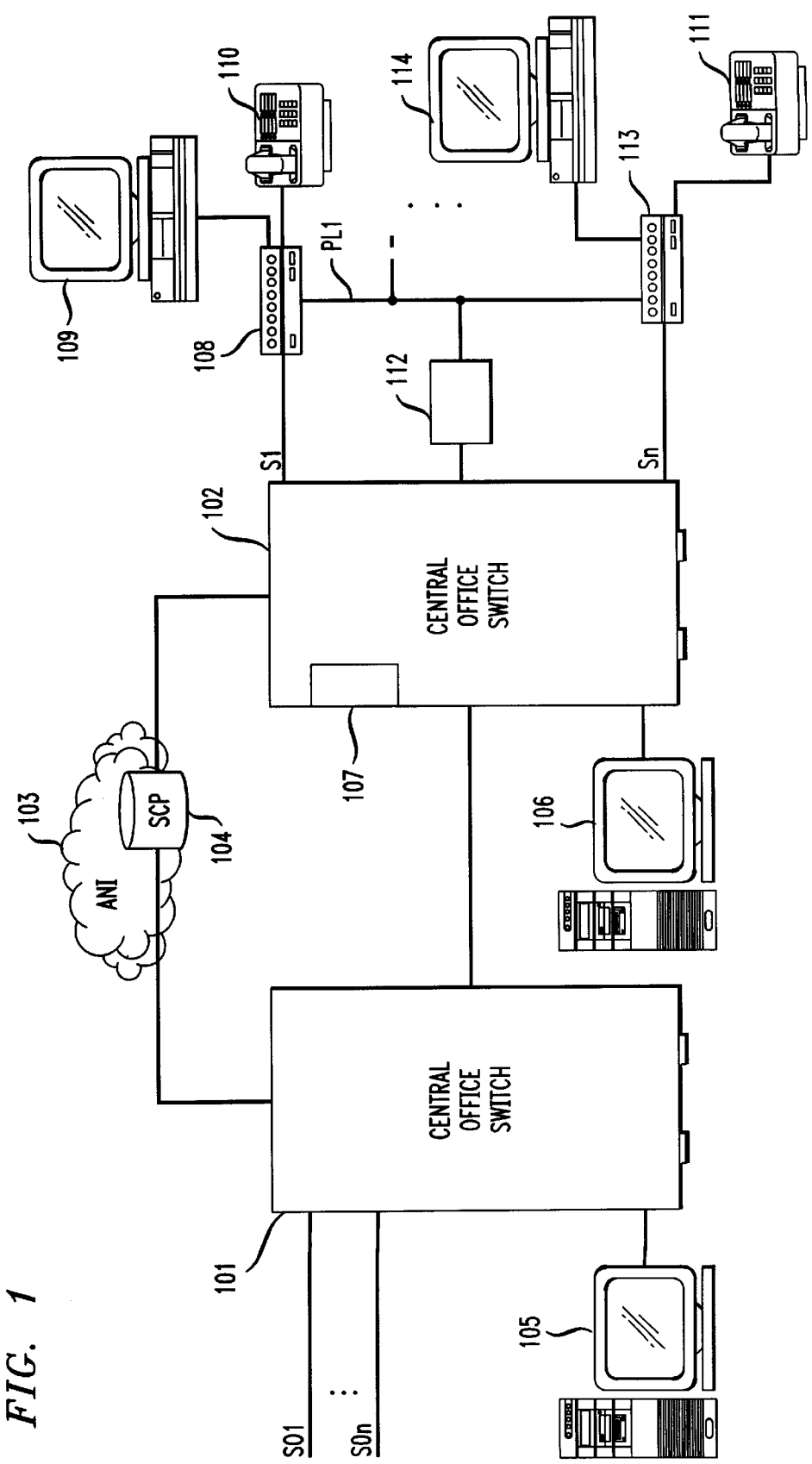
FIG. 1 illustrates in block diagram form the system for party line access of a subscriber line via a suppressed ringing connection and an operating environment in which such system is typically located.

FIG. 1 illustrates in block diagram form the system for party line access of a subscriber line via a suppressed ringing connection and an operating environment in which such system is typically located. In particular, a switching system, such as the central office switch 102, serves a plurality of local loops S1–Sn, termed "subscriber lines" herein. Each subscriber line S1 is typically terminated with some form of customer premise equipment, such as telephone station set, modem, telemetry equipment or combinations of such equipment.

The subscriber line S1 is terminated with a network interface unit 108 that serves to interconnect telephone station set 110 and at least one telemetry apparatus 109 to the subscriber line S1. This telemetry apparatus 109 is shown as a single element, but can comprise a plurality of elements, such as: utility meter telemetry equipment, appliance controllers, medical monitoring equipment and the like. In addition, the network interface unit 108 serves two lines, subscriber line S1 and telemetry party line PL1 thereby enabling two communication paths to all of the customer premise equipment. The telemetry party line PL1 is connected to a plurality of subscriber network interface units and two of these subscriber network interface units 108, 113 are illustrated in FIG. 1.

Figure 3:
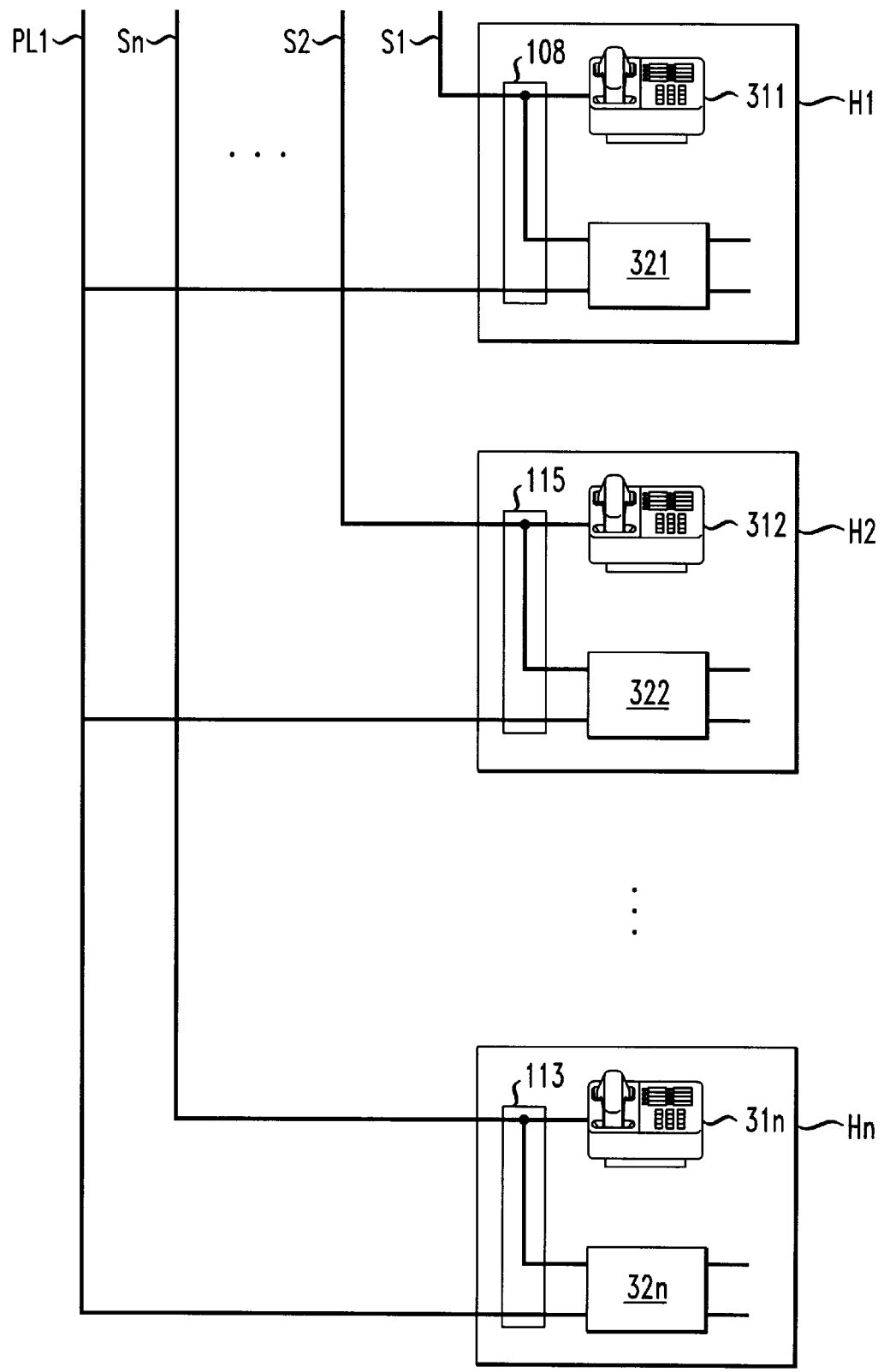
FIG. 3 illustrates in block diagram form additional details of the party line interconnection of the subscriber network interfaces.

A typical interconnection of subscriber network interfaces using a party line is shown in block diagram form in FIG. 3, wherein a plurality of houses, H1–Hn, are each served by a dedicated subscriber line S1–Sn and a common or neighborhood party line PL1. In each house H1–Hn, a telephone station set 311–31n is connected to the subscriber line S1–Sn via the associated subscriber network interface 108, 115, 113. The associated subscriber network interface 108, 115, 113 is also connected to the neighborhood party line PL1. The subscriber network interface 108, 115, 113 serves to interface the customer premise equipment 321–32n in each house H1–Hn to both the subscriber line S1–Sn and the neighborhood party line PL1.

Suppressed Ringing Connections

A suppressed ringing connection comprises a direct connection through a switching system to a selected subscriber line, with the provision of no features for that subscriber line. What this entails is the deactivation (or disregarding) of all local exchange carrier provided services, such as: call waiting, call forwarding, call blocking, to thereby enable the uninterrupted connection of the accessing service provider to the selected subscriber line. The interconnection of the service provider to the subscriber line enables the service provider to perform tests on this physical link and/or transmit any desired control signals directly to whatever apparatus is connected to the subscriber line and receive any responses therefrom.

Traditionally, suppressed ringing connections were used by utility companies to provide remote utility meter reading functions. This was accomplished by the use of a Central Office Service Unit (COSU) that was directly connected to the central office switch via dedicated Utility Telemetry Trunks (UTT) to thereby enable the COSU to connect the utility company telemetry polling unit to concurrently access a plurality of subscriber lines S1–Sn via the plurality of UTTs. However, the provision of dedicated UTTs presents a problem due to the fact that this equipment is expensive to provide and maintain even though its use is infrequent. However, existing systems are limited to such an architecture due to the limited functionality that was available in the serving central office switch.

Advances in central office switch technology have provided additional data provisioning opportunities. In particular, the identity of a calling party and validation of their authenticity can be effected in a reliable manner and this data passed along through intervening local exchange carrier switches to the serving central office to thereby now enable the present system for remotely accessing a subscriber line via a suppressed ringing connection to permit individual access directly to a subscriber line via a suppressed ringing connection. Such direct access opens the opportunity for many service providers to access equipment located at the subscriber premises and connected to the subscriber line. Data collection and data transmission capabilities are therefore now available to any authorized service provider via a suppressed ringing connection on the subscriber line without the necessity of providing a dedicated line for this purpose. The types of data transfer operations that can be implemented include, but are not limited to: meter reading, delivery of message waiting indications, delivery of Internet data.

Directly Accessing a Subscriber Line Via a Suppressed Ringing Connection

Figure 2:
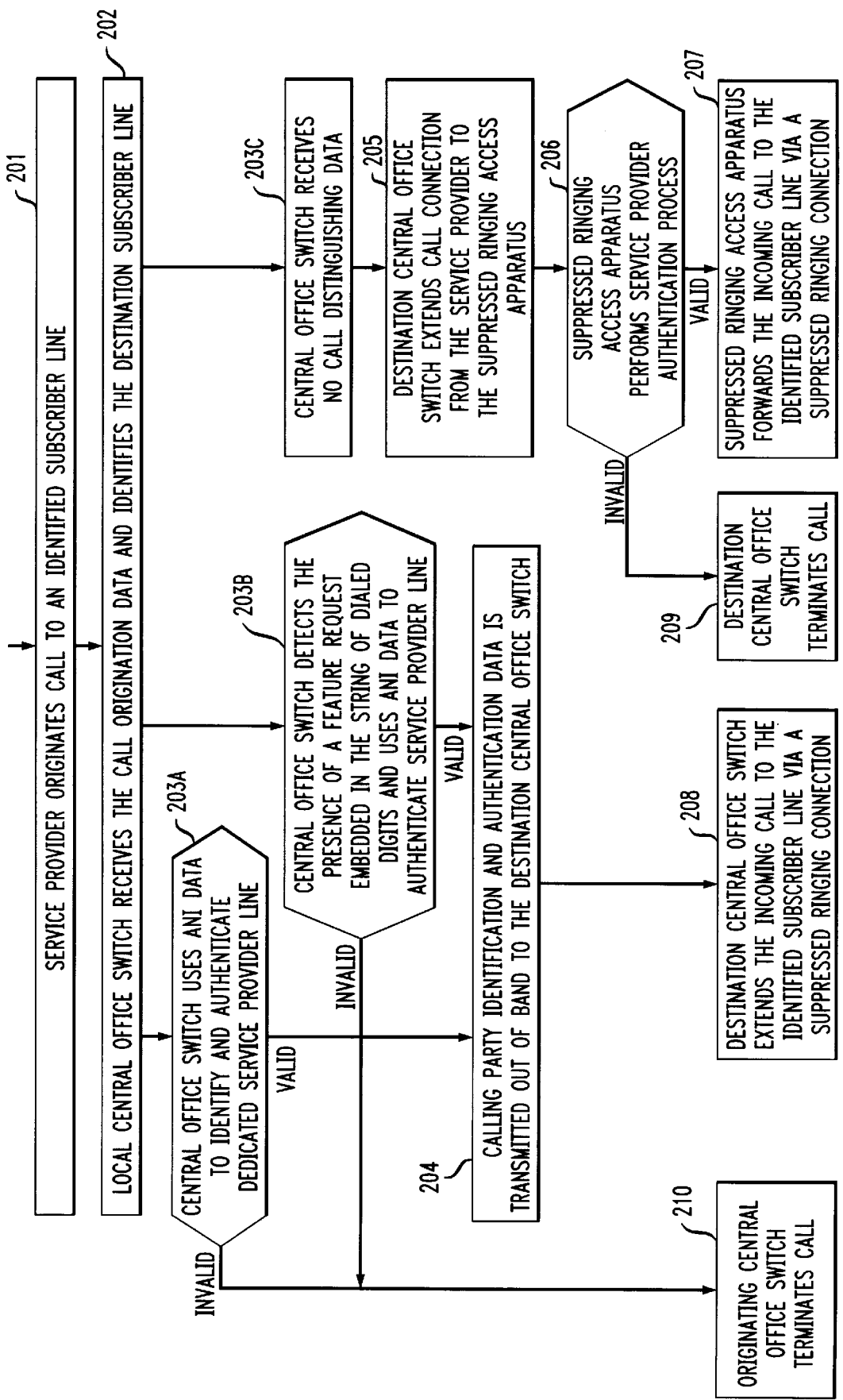
FIG. 2 illustrates in flow diagram form the operational steps taken by the present system for party line access of a subscriber line via a suppressed ringing connection to perform a typical subscriber line access operation.

FIG. 2 illustrates in flow diagram form the operational steps taken by the present system for party line access of a subscriber line via a direct suppressed ringing connection to perform a typical subscriber line access operation. The process begins at step 201 where the service provider 105 originates a subscriber line access call to an identified subscriber line Si served by a selected central office switch 102. The local central office switch 101 receives the call origination data at step 202 from the service provider 105 and identifies the destination subscriber line S1. The present example illustrates the extension of this call connection from an originating central office switch 101 to a destination central office switch 102, but the service provider 106 could alternatively be connected to the destination central office switch 102. For the purpose of illustrating the present system, the multiple central office switch example is used herein but is not intended to limit the scope of the described concept.

The nature of the call can be determined by one of a plurality of methods. In particular, at step 203A, the central office switch 101 can use the Automatic Number Identification ANI data that is automatically generated by central office switch 101 as part of the call origination by the service provider 105 to identify this service provider line as one dedicated for suppressed ringing connection access. Thus, if the ANI either matches the list of dedicated lines stored in the memory of central office switch 101 or central office switch 102 (or an adjunct data processor associated therewith), or triggers an AIN lookup and subsequent access to service control point 104, the call origination is designated as a suppressed ringing connection request or abbreviated ringing connection request. Alternatively, at step 203B, central office switch 101 can detect the presence of a feature request embedded in the string of digits dialed by the service provider 105 as part of the call origination. In particular, the service provider 105 can prepend a feature request code (*8*, for example) to the dialed digits that identify the destination subscriber line S1 to thereby request a suppressed ringing connection access to this destination. Furthermore, the feature request code can include data digits that further characterize the suppressed ringing call, such as call duration, type of data collection, abbreviated ringing duration, and the like. The central office switch 101 then designates the call origination as a suppressed ringing connection request due to the presence of this code if the ANI data that is automatically generated by central office switch 101 as part of the call origination by the service provider 105 also identifies this service provider line as one dedicated for suppressed ringing connection access. In either case, the line from which the service provider 105 originates the call is automatically identified by the local central office switch 101 and, if this line is defined as being authorized to initiate direct suppressed ringing connections to subscriber lines (and possibly with the granularity that authorization is only to a certain class of subscriber lines), this data along with the calling party identification is transmitted out of band to the local central office switch 102 that serves the selected subscriber line S1 at step 204. This is accomplished by the use of the signal control point 104 of the intelligent network 103 that interconnects the central office switches 101, 102. Thus, when the call connection from the originating central office switch 101 reaches the terminating local central office switch 102, the call setup data is concurrently received via an out of band data channel 103. Upon receipt of the incoming call and the out of band call control data that associates a request a suppressed ringing connection access with the call connection to the designated subscriber line Si, the destination central office switch 102 establishes a suppressed ringing connection to the designated subscriber line S1 in well known fashion at step 208. If, however, the authentication of the service provider 105 fails, the call connection is rejected at step 210 and call processing exits.

The second category of suppressed ringing access call identification includes authorization on a per call basis. Thus, at step 203C, there is no indication from the service provider 105 to the central office switch 101 that the call origination is a suppressed ringing access connection, since the service provider 105 dials the number of a predefined access line, which connects the service provider 105 to a suppressed ringing access apparatus 107 that authenticates the identity of the service provider 105 and their authority to initiate a suppressed ringing access connection to the selected subscriber line S1. Thus, at step 205, the central office switch 102 connects the call connection from the service provider 105 to the suppressed ringing access apparatus 107. At step 206 the suppressed ringing access apparatus 107 performs a service provider authentication process, which comprises a validation, using well known authentication techniques such as passwords and the use of ANI data if available, of both the identity of the service provider 105 as well as their authority to obtain a suppressed ringing access connection to the destination subscriber line S1.

This service provider authentication process can include access to a service profile for the service provider 105 to determine specific service control information, such as queue timing, call priority, and the like. Once the service provider authentication is accomplished, the suppressed ringing access apparatus 107 then forwards the incoming call to the identified subscriber line S1 via a suppressed ringing connection at step 207. However, if the service provider 105 authentication fails, the destination central office switch 102 rejects the call connection and call processing exits at step 209.

Telemetry Connection to Network Interface Unit

The above description, illustrates the establishment of the initial stages of the suppressed ringing connection. In the present party line telemetry system, at steps 207 and 208, the central office switch 102 implements the suppressed ringing connection by intercepting the call connection destined for the designated subscriber line S1 if the line is unavailable and routing the call connection to the telemetry party line PL1 associated with the subscriber line S1. The central office switch 102 retrieves data from its internal mapping tables to identify the telemetry party line PL1 and then interconnects the service provider 105 to the telemetry party line PL1. The connection of the service provider 105 (or alternatively a COSU) to the telemetry party line PL1 can be accomplished in a number of ways. A first mode of connection is where the central office switch 102 performs the telemetry access of a specific network interface unit 108, 115, 113 via party line circuit 112 which performs the distinctive party line signaling of the selected subscriber's network interface unit 108, 115, 113 via different tones or FSK subaddress. Once the selected network interface unit 108, 115, 113 responds to the alerting signal, the party line circuit 112 connects the service provider 105 which can then poll the telemetry equipment that is served by the selected network interface unit 108, 115, 113. Alternatively, the central office switch 102 does not activate party line circuit 112 to perform the distinctive party line signaling of the selected subscriber's network interface unit 108,115, 113, but instead implements a suppressed ringing connection through the party line circuit 112 to the party line PL1. Once connected to the party line PL1, the service provider 105 can provide the specific alerting signals to select a one of the plurality of network interface units 108, 115, 113 that are bridged on to the telemetry party line PL1. Once the selected network interface unit 108, 115, 113 responds to the alerting signal, the service provider 105 can then poll the telemetry equipment 321–32n that is served by the selected network interface unit 108, 115,113. This connection requires the party line circuit 112 to have a delayed disconnect since the service provider 105 must provide the alerting signals once the connection to the party line PL1 is achieved. Finally, instead of signaling a single subscriber network interface unit 108, 115, 113, the service provider can sequence through a plurality of such units by seriatim applying the distinctive signaling to the telemetry party line PL1 associated with each of these network interface units. Each network interface unit 108, 115, 113 responds to its assigned poll signal by directly interconnecting the telemetry apparatus 321–32n to the telemetry party line PL1 for the transmission of data, as is known in telemetry systems.

Once connected to the subscriber telemetry equipment, the service provider 105 can perform the desired telemetry or test operation. In this manner, the service provider 105 can obtain party line suppressed ringing connection access to any subscriber served by any switching system 102, 101 without having the telemetry call interrupted or blocked from connecting to a subscriber line.

What is claimed:

1. Apparatus for enabling a service provider to access a selected one of a plurality of telemetry equipment, each of said plurality of telemetry equipment being associated with a corresponding subscriber line that connects an associated customer premise equipment to a central office switch, comprising:

party line means for providing a single point of access to at least two of said plurality of telemetry equipment;

means, associated with each of said at least two of said plurality of telemetry equipment, for interfacing each of said at least two of said plurality of telemetry equipment with said party line means and said corresponding subscriber line; and means for activating access for said service provider to a selected one of said at least two of said plurality of telemetry equipment via said party line means.

2. The apparatus of claim 1 wherein said party line means comprises:

means for bridging at least two of said means for interfacing to a single line to implement a party line connection to said at least two of said plurality of telemetry equipment served by said at least two of said means for interfacing.

3. The apparatus of claim 2 wherein said means for interfacing comprises:

means for interpreting address signals received over said party line connection; and means, responsive to said address signals identifying said means for interfacing, for directly interconnecting said telemetry equipment associated with said subscriber line to said party line connection.

4. The apparatus of claim 1 wherein said means for activating comprises:

means, responsive to a request from said service provider to access an identified subscriber line, for automatically redirecting said subscriber line access to said party line means that is connected to a means for interfacing associated with said identified subscriber line.

5. A method for enabling a service provider to access a selected one of a plurality of telemetry equipment, each of said plurality of telemetry equipment being associated with a corresponding subscriber line that connects an associated customer premise equipment to a central office switch, comprising the steps of:

providing, via party line apparatus a single point of access to at least two of said plurality of telemetry equipment;

interfacing, via an interface apparatus associated with said at least two of said plurality of telemetry equipment, each of said at least two of said plurality of telemetry equipment with said, party line apparatus single point of access and said corresponding subscriber line; and activating access for said service provider to a selected one of said at least two of said plurality of telemetry equipment via said single point of access.

6. The method of claim 5 wherein said step of providing comprises:

bridging at least two of said interface apparatus to a single line to implement a party line connection to said at least two of said plurality of telemetry equipment served by said at least two of said interface apparatus.

7. The method of claim 6 wherein said step of interfacing comprises:

interpreting address signals received over said party line connection; and directly interconnecting, in response to said address signals identifying said interface apparatus, said telemetry equipment associated with said subscriber line to said party line connection.

8. The method of claim 5 wherein said step of activating comprises:

automatically redirecting, in response to a request from said service provider to access an identified subscriber line, said subscriber line access to said single point of access that is connected to a interface apparatus associated with said identified subscriber line.

9. Apparatus for enabling a service provider to access a selected one of a plurality of telemetry equipment, each of said plurality of telemetry equipment being associated with a corresponding subscriber line that connects an associated customer premise equipment to a central office switch, comprising:

party line port for providing a single point of access to at least two of said plurality of telemetry equipment;

network interface units, associated with said at least two of said plurality of telemetry equipment, for interfacing each of said at least two of said plurality of telemetry equipment with said party line port and said corresponding subscriber line; and access circuit to connect said service provider to a selected one of said at least two of said plurality of telemetry equipment via said party line port.

10. The apparatus of claim 9 wherein said party line port comprises:

bridge circuit for connecting at least two of said network interface units to a single line to implement a party line connection to said at least two of said plurality of telemetry equipment served by said at least two of said network interface units.

11. The apparatus of claim 10 wherein said network interface unit comprises:

address circuit for interpreting address signals received over said party line connection; and switch apparatus, responsive to said address signals identifying said network interface unit, for directly interconnecting said telemetry equipment associated with said subscriber line to said party line connection.

12. The apparatus of claim 9 wherein said suppressed ringing connection access circuit comprises:

call redirection circuit, responsive to a request from said service provider to access an identified subscriber line, for automatically redirecting said subscriber line access to said single point of access that is connected to a network interface unit associated with said identified subscriber line.

* * * * *